US011841903B2

United States Patent
Lydick et al.

(10) Patent No.: US 11,841,903 B2
(45) Date of Patent: Dec. 12, 2023

(54) GRAPH OPERATIONS ENGINE FOR TENANT MANAGEMENT IN A MULTI-TENANT SYSTEM

(71) Applicant: MICROSOFT TECHNOLOGY LICENSING, LLC, Redmond, WA (US)

(72) Inventors: Neil Evan Lydick, Bothell, WA (US); Ling Yan, Bothell, WA (US); Jagadeesh Kalki, Redmond, WA (US); Michael Speer, Seattle, WA (US); Ciaran Murphy, Kenmore, WA (US)

( * ) Notice: Subject to any disclaimer, the term of this patent is extended or adjusted under 35 U.S.C. 154(b) by 102 days.

(21) Appl. No.: 17/239,343

(22) Filed: Apr. 23, 2021

(65) Prior Publication Data
US 2022/0342933 A1 Oct. 27, 2022

(51) Int. Cl.
*G06F 16/901* (2019.01)
*G06F 16/27* (2019.01)
*G06F 9/50* (2006.01)
*G06F 9/54* (2006.01)

(52) U.S. Cl.
CPC ........ *G06F 16/9024* (2019.01); *G06F 9/5072* (2013.01); *G06F 9/547* (2013.01); *G06F 16/27* (2019.01)

(58) Field of Classification Search
None
See application file for complete search history.

(56) References Cited

U.S. PATENT DOCUMENTS

| | | | | |
|---|---|---|---|---|
| 8,417,723 | B1* | 4/2013 | Lissack | G06F 21/335 707/781 |
| 11,386,158 | B1* | 7/2022 | Bourbie | G06F 16/90324 |
| 2013/0111036 | A1* | 5/2013 | Ozawa | H04L 41/0893 709/226 |

(Continued)

OTHER PUBLICATIONS

Laud Charles Ochei et al, "Evaluating Degrees of Multitenancy Isolation: A Case Study of Cloud-hosted GSD Tools", 2015 International Conference on Cloud and Autonomic Computing, 12 pages. (Year: 2015).*

(Continued)

*Primary Examiner* — Uyen T Le
(74) *Attorney, Agent, or Firm* — Shook, Hardy & Bacon L.L.P.

(57) ABSTRACT

Methods, systems, and computer storage media for providing a multi-tenant system that executes graph language requests using graph operations of a graph language. A graph language request—that configures tenant data for tenants in a multi-tenant system—is executed using a graph operations engine. The graph operations engine receives and parses a graph language request that includes a list of tenants and a definition of data operations. The set of data operations of the definition are executed on a tree of data operation nodes comprising a plurality of leaf nodes and a root node. Executing the data operations is based on graph language actions (e.g., composition, transformation, and aggregation) that support asynchronously returning results data associated with configuring the Tenant data. Executing the data operations of the definition causes generation of results data (Continued)

(e.g., root node results or leaf node results) configuration of the tenant data in the multi-tenant system.

20 Claims, 10 Drawing Sheets

(56) References Cited

U.S. PATENT DOCUMENTS

| | | | |
|---|---|---|---|
| 2014/0279857 A1 | 9/2014 | Bharadwaj et al. | |
| 2016/0188656 A1* | 6/2016 | Ekanadham | G06F 16/2379 707/755 |
| 2017/0091246 A1* | 3/2017 | Risvik | G06F 16/2471 |
| 2017/0242881 A1* | 8/2017 | Northfleet | G06F 16/288 |
| 2018/0218044 A1* | 8/2018 | Wong | G06F 16/2282 |
| 2019/0058709 A1* | 2/2019 | Kempf | H04L 63/0876 |
| 2019/0095498 A1* | 3/2019 | Srinivasan | H04L 63/102 |
| 2019/0098055 A1 | 3/2019 | Pitre et al. | |
| 2020/0226156 A1 | 7/2020 | Borra et al. | |
| 2021/0136083 A1* | 5/2021 | Gordon | H04W 12/08 |

OTHER PUBLICATIONS

Faith Gey et al, "Middleware for Customizable Multi-staged Dynamic Upgrades of Multi-tenant SaaS Applications", 2015 IEEE/ACM 8th International Conference on Utility and Cloud Computing, 10 pages. (Year: 2015).*

Werner Bux, "Token-Ring Local-Area Networks and Their Performance", Proceedings of the IEEE, vol. 77, No. 2, Feb. 1989, 19 pages. (Year: 1989).*

"Understanding the Azure Resource Graph query language", Retrieved from: https://web.archive.org/web/20201202171954/https://docs.microsoft.com/en-us/azure/governance/resource-graph/concepts/query-language, Nov. 18, 2020, 9 Pages.

"International Search Report and Written Opinion Issued in PCT Application No. PCT/US22/023205", dated Jun. 29, 2022, 12 Pages.

Shirolkar, Anup, "A Comprehensive Guide to Apache Cassandra Architecture", Retrieved from: https://www.instaclustr.com/blog/cassandra-architecture/, Apr. 23, 2020, 7 Pages.

"Graphlang.g4", Retrieved from: https://dev.azure.com/msazure/One/_git/Intune-Redist-MTM?path=%2Fsrc%2FCore%2FGraphLang%2FGrammar%2Fgraphlang.g4, Retrieved Date: May 26, 2020, 1 Page.

"How to substitute a query parameter in a string url", https://stackoverflow.com/questions/40177372/how-to-substitute-a-query-parameter-in-a-string-url, Retrieved Date: May 26, 2020, 3 Pages.

"How to use GString substitution within for json", Retrieved from: https://stackoverflow.com/questions/34301623/how-to-use-gstring-substitution-within-for-json, Retrieved Date: May 26, 2020, 3 Pages.

"HTTP pipelining", Retrieved from: https://en.wikipedia.org/wiki/HTTP_pipelining, Dec. 19, 2020, 6 Pages.

"HttpUtility.HtmlEncode Method", Retrieved from: https://docs.microsoft.com/en-us/dotnet/api/system.web.httputility.htmlencode?view=netcore-3.1, Retrieved Date: May 26, 2020, 6 Pages.

"OData Version 4.01. Part 1: Protocol", Retrieved from: https://docs.oasis-open.org/odata/odata/v4.01/odata-v4.01-part1-protocol.html, Apr. 23, 2020, 94 Pages.

"Recursive URL Substitution Syntax", Retrieved from: https://web.archive.org/web/20171128150406/http://wiki.secondlife.com/wiki/Recursive_URL_Substitution_Syntax, Nov. 28, 2017, 4 Pages.

"Sending a pipelined sequence of requests", https://www.IBM.com/support/knowledgecenter/en/SSGMCP_5.1.0/com.ibm.cics.ts.internet.doc/topics/dfhtl_outmaking_pipeline.html, Retrieved Date: May 26, 2020, 3 Pages.

"What is HTTP pipelining?", Retrieved from: https://web.archive.org/web/20200516062605/https://www-archive.mozilla.org/projects/netlib/http/pipelining-faq.html, May 16, 2020, 3 Pages.

Eby, et al., "Update androidCompliancePolicy", Retrieved from: https://docs.microsoft.com/en-us/graph/api/intune-deviceconfig-androidcompliancepolicy-update?view=graph-rest-beta, Nov. 18, 2020, 10 Pages.

Latham, et al., "Call a web API from ASP.NET Core Blazor", Retrieved from: https://docs.microsoft.com/en-us/aspnet/core/blazor/call-web-api?view=aspnetcore-3.1, Jun. 24, 2020, 14 Pages.

Parr, Terence, "What is ANTLR?", Retrieved from: https://www.antlr.org/, Retrieved Date: May 26, 2020, 3 Pages.

"Interlocked Class", Retrieved from: https://web.archive.org/web/20201112043009/https://docs.microsoft.com/en-us/dotnet/api/system.threading.interlocked?view=net-5.0, Nov. 12, 2020, 9 Pages.

\* cited by examiner

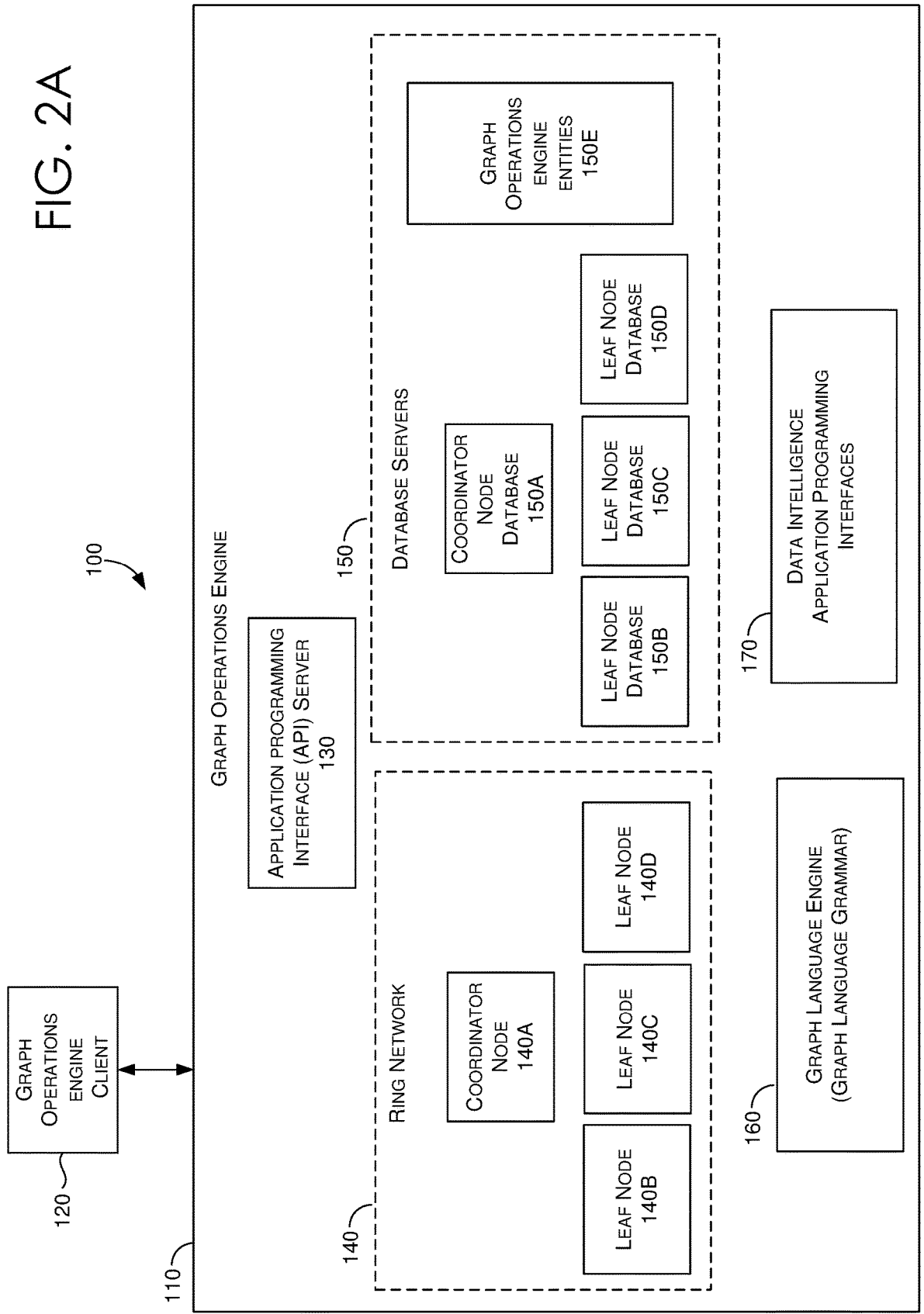

GRAPH OPERATIONS ENGINE FOR TENANT MANAGEMENT IN A MULTI-TENANT SYSTEM

BACKGROUND

Users rely on applications and services to perform computing tasks. Distributed computing systems (e.g., cloud computing platforms) host applications and services using computing architectures that support network access to a shared pool of configurable computing and storage resources. A multi-tenant system (or multi-tenant infrastructure) of a cloud computing platform provides an operating environment that supports customer workloads and cloud computing objects (e.g., user accounts, applications, and services) that are part of the software and hardware architecture of the cloud computing platform. For example, a tenant can refer to a grouping of cloud computing objects (e.g., tenant data) that allow an administrator to set policies—on the user accounts within the organization and the applications that the organization owns—to meet their security and operational policies.

Conventionally, multi-tenant systems are not configured with a multi-faceted and integrated solution for managing tenants in a cloud computing platforms. For example, developers usually support multi-tenant systems using custom-built tools that do not adequately address the scope of tenant management operations needed to efficiently configure tenant data (e.g., access and security policies) to ensure consistency across tenants. As such, a more comprehensive multi-tenant system—with an alternative basis for performing multi-tenant system operations—can improve computing operations and interfaces for multi-tenant systems in cloud computing platforms.

SUMMARY

Various aspects of the technology described herein are generally directed to systems, methods, and computer storage media, for among other things, providing graph operations that execute graph language requests for tenant management in a multi-tenant system. Graph operations are operations that are executed as a tree of data operations, where the data operations are executed based on a graph language request constructed based on a first command library and annotations using a second command library. The graph language request—that configures or updates tenant data for tenants in the multi-tenant system—is executed using the graph operations engine. The graph language request includes a list of tenants (i.e., tenant identifiers associated with corresponding tenants) and a definition of data operations (e.g., a first data operation parameter of a first data operation and a second data operation parameter of a second data operation). The data operations of the definition are executed on a tree of data operation nodes comprising a plurality of leaf nodes and a root node. Executing the data operations is based on graph language actions (e.g., composition, transformation, aggregation, periodic streaming of a subset of results data, and sequencing of data operations) that support asynchronously returning results data associated with updating the tenant data. Executing the data operations of the definition causes generation of results data (e.g., root node results or leaf node results) configuration of the tenant data in the multi-tenant system. The results data can be referred to as a set of results data, which is associated with non-null set of results data.

By way of background, a multi-faceted and integrated solution for managing tenants in cloud computing platforms has not been implemented because of the challenges in developing an efficient tenant management system—that adequately addresses the scope of tenant management operations needed—to configure tenant data (e.g., access and security policies) to ensure consistency across tenants. In particular, developers that support computing environments of customers of a cloud computing platform often rely on custom-built solutions—that require coding, shipping, and maintaining custom APIs—for different scenarios that process API calls to backend services of a multi-tenant system. Maintaining custom APIs can present several operational limitations in managing tenants because of tedious specialized code development associated custom APIs in different scenarios, limited interoperability of custom APIs, likelihood of errors when customizing APIs, non-user friendly user interfaces, and a lack of a consistent solution for a repeated tenant management operations.

A technical solution—to the limitations of conventional multi-tenant system operations—provides graph operations of a graph operations engine to support tenant management. In operation, the graph operations engine accesses a graph language request comprising a list of tenants (e.g., tenant identifiers in the graph language request) and a definition of data operations that execute the graph language request on the list of tenants. Using each of a plurality of the computing nodes, data operations of the definition—that causes updating tenant data of the list of tenants—are executed. The data operations are assigned to corresponding computing nodes of the plurality computing nodes. Executing the data operations comprises performing at least two of the following: based on the definition, composing the data operations using request parameters of a first command library and request parameters of a second command library; transforming the data operations of the definition into a tree of data operation nodes that each accept and return data corresponding to the data operations; and aggregating, using an aggregation definition of the graph language request, a plurality of results of the data operations into a consolidated result set. The plurality of nodes further generate, for the graph language request, a set of results that are based on executing the data operations, and then storing the set of results.

In addition, the graph language request can be implemented using an Application Programming Interface (API) server, a plurality computing nodes in an interconnected ring network, a plurality of databases. The API server that receives and communicates the graph language request to a coordinator node of a plurality of computing nodes. The coordinator node operates as a root node that operates with a plurality of leaf nodes—from the plurality of computing nodes—to execute the graph language request. Executing data operations of the graph language request can further be based on graph language support for tenant partitions corresponding to diverse workloads that are retrieved via a set of data intelligence APIs (i.e., data APIs) and aggregation of results data to cause consolidation of a plurality of results of the data operations of the graph language request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 2A and 2B are exemplary multi-tenant system environments for providing graph operations using a graph operations engine in a multi-tenant system, in accordance with aspects of the technology described herein;

DETAILED DESCRIPTION

Figure 1A:
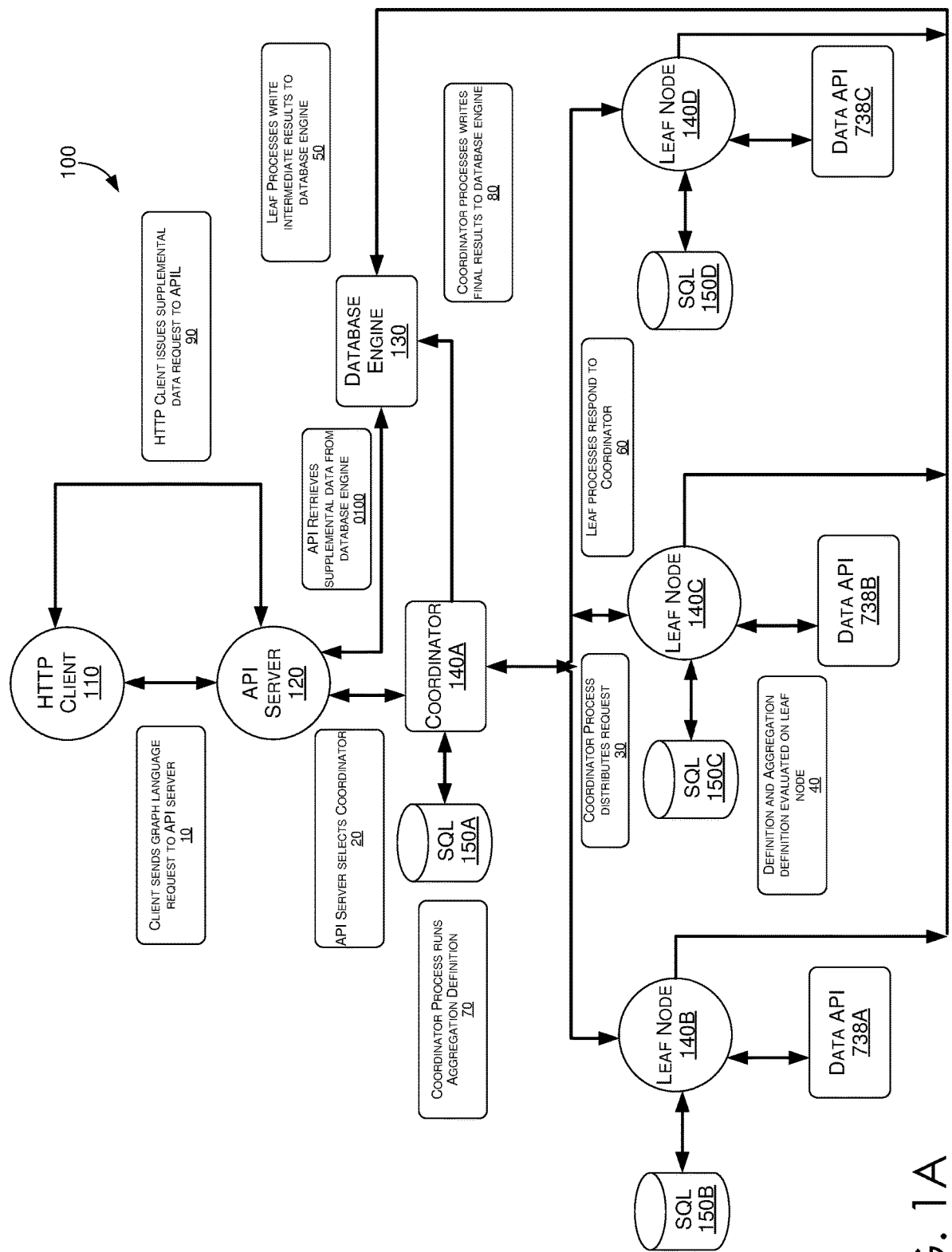
FIGS. 1A-1C are block diagrams of an exemplary multi-tenant system environment for providing graph operations using a graph operations engine in a multi-tenant system, suitable for use in implementing aspects of the technology described herein.

Overview of Technical Problems, Technical Solutions, and Technological Improvements Cloud computing provides on-demand computing resources (e.g., network, compute, and storage) based on shared resources. A customer of a cloud computing platform may pay for a particular cloud computing service model (e.g., service-oriented architecture) in exchange for using distributed computing resources of a cloud computing platform. The cloud computing platform can provide different constructs (e.g., computing instances) that support managing a customer's multi-tenant infrastructure. For example, a tenant can refer to a grouping of cloud computing objects that allow an administrator to set policies—on the user accounts within the organization and the applications that the organization owns—to meet their security and operational policies. Cloud computing platform can support tenant management functionality, allowing for performing managing operations across resources and tenants. In particular, customers of cloud computing platforms often want to deliver managed services using management tools, such that customers maintain control over who can access their computing environments, which resources they can access, and what actions can be taken. Tenant management ideally should be provided at scale, with visibility and precision for customers, and a comprehensive and unified platform Conventionally, multi-tenant systems are not configured with a multi-faceted and integrated solution for managing tenants in a cloud computing platforms. Customers of a cloud computing platform have not been able to efficiently implement operations across a subset of tenants (i.e., grouping of computing resources) that they manage in their multi-tenant infrastructure. Developers support multi-tenant systems using custom-built tools that do not adequately address the scope of tenant management operations needed to efficiently configure tenant data (e.g., access and security policies) to ensure consistency across tenants. In particular, developers that support computing environments of customers of a cloud computing platform often have to inefficiently support tenants by coding, shipping, and maintaining custom Application Programming Interfaces (API) for different scenarios that require API calls to backend services for their multi-tenant infrastructure. Conventional APIs that call additional downstream APIs are based on small unitary pieces code ("specialized code") that perform specific operations associated with a particular task of tenant management in a distributed computing system. Specialized, at best, can operate to perform particular operations associated with tenant management without a unified approach.

Moreover, each specialized code is performed to generate individual results that are then manually aggregated. Even minor changes in the same request (e.g., request for a change to user account settings, and a request for a change to device settings) have to be manually configured. Additional computational overhead can be incurred in situations when each specialized code is managed via a corresponding API. Additionally, the current operating environment of specialized code does not contemplate APIs operating with a set of machines associated with a pipeline and sequencing for performing operations for tenant management. In particular, specialized code-based implementation do not commonly face the challenge of scaling tenant management operations with a set of machines, or time considerations for performing tenant management operations. As such, a more comprehensive multi-tenant system—with an alternative basis for performing multi-tenant system operations—can improve computing operations and interfaces for multi-tenant systems in cloud computing platforms.

Embodiments of the present invention are directed to simple and efficient methods, systems, and computer storage media for, providing graph operations that execute graph language requests for tenant managements of a multi-tenant system. Graph operations are operations that are executed as a tree of data operations, where the data operations executed based on a graph language request constructed based on first command library and annotations using a second command library. The graph language request—that configures or updates tenant data for tenants in the multi-tenant system—is executed using the graph operations engine. The graph language request includes a list of tenants and a definition of data operations. The data operations of the definition are executed on a tree of data operation nodes comprising a plurality of leaf nodes and a root node. Executing the data operations is based on graph language actions (e.g., composition, transformation, aggregation, periodic streaming of a subset of results data, and sequencing of data operations) that support asynchronously returning results data associated with updating the tenant data. Executing the data operations of the definition causes generation of results data (e.g., root node results or leaf node results) configuration of the tenant data in the multi-tenant system.

By way of example, a client communicates a graph language request to an Application Programming Interface (API) server. The graph language request includes graph language parameters (e.g., a definition parameters for data operations that include commands from a first command library (e.g., Hypertext Transfer Protocol) and commands from a second command library— (e.g., Structured Query Language). The graph language parameters support executing the graph language request to update tenant data. The graph language parameters can identify a list of tenants, a definition of data operations, and aggregation definitions. The definition of data operations are executable as a tree of data operation nodes that each accept and return data corresponding to the data operations of the node.

The API server selects a coordinator node from a plurality of computing nodes in a ring network of interconnected computing nodes. For example, the ring network can include plurality of computing nodes in an interconnected ring network having each computing node connected to at least two other computing nodes. The coordinator node parses and distributes the graph language request to cause execution of corresponding data operations at each of a plurality of leaf nodes from the ring network. The plurality of leaf nodes write intermediate results (i.e., leaf node results) and communicate the intermediate results to a database engine. The intermediate results can be periodically or incrementally streamed from the plurality of leaf node up towards the root node, streaming the intermediate results is based on a threshold criteria (e.g., intermediate results batch size or result count) for streaming the intermediate results to support parallel execution of the data operations.

The plurality of leaf nodes further respond (e.g., communicate the intermediate results) to the coordinator node—indicating completion of their corresponding data operations. The coordinator node generates final results (i.e., root node results) and communicates the final results to a database engine. When the graph language request includes an aggregation definition, the coordinator node uses an aggregation definition in the graph language request to aggregate a plurality of results of the data operations into a consolidated result set. The client can issue supplemental data requests to the API server to cause the API server to retrieve supplemental data (i.e., graph operations engine entities) from database engines associated with the coordinator node or the leaf node.

In contrast to conventional implementations of graph operations, the graph operations discussed herein are directed to implementing graph operations that configure tenants in a cloud computing platform with tenant data. Graph operations are operations that are executed as a tree of data operations, where the data operations executed based on a graph language request constructed based on a first command library and annotations using a second command library. A multi-tenant system can include a multi-tenant infrastructure associated with a customer of a cloud computing environment having their corresponding tenant data. Tenant data can include tenant settings of a grouping of cloud computing objects that allow an administrator to set policies—on the user accounts within the organization and the applications that the organization owns—to meet their security and operational policies. Tenant data may specifically be stored as partitioned data (e.g., partitioned tenant data) that are retrieved at computing nodes—based on data operations corresponding to the computing nodes—such that the partitioned data is used in executing the data operations. The graph operations are performed via a graph operations engine—that is a piece or collection of software and/or hardware—which drives operations to perform tasks associated with data.

The graph language request—that is communicated to update tenant data—can be a statement or message communicated between computing objects or devices to execute operations on data (e.g., partitioned data). For example, a graph language request can change a setting—an adjustable attribute in a software program or hardware device—associated with data. The graph language request provides instructions for executing graph operations—that are actions (e.g., inputting, processing, outputting, storing, and controlling)—performed to accomplish particular tasks on graph data.

The graph language of the graph language request includes a set of instructions—associated with a graph language grammar—for performing data operations on graph data to update tenant data. For example, a computer-implemented method can execute the set of instructions causing generation of a set of results of the data operations. The graph language request can include a list of tenants, a definition of data operations, and an aggregation definition. The graph language parameters of the graph language—commands from a first command library (e.g., Hypertext Transfer Protocol) and commands from a second command library— (e.g., Structured Query Language)—support executing the graph language request to update tenant data. The graph language (e.g., a graph language grammar) supports different types functionality, for example, the graph language supports wrapping SQL code (e.g., SQLite) in a lambda function, and the graph language also supports performing data operations without further simplifying or adapting raw SQLite syntax, and is operable to not require any complex structure in the data that is returned.

Several additional technical features, associated with graph operations for embodiments described herein, include comprehensive markup support for HTTP graph language requests, processing data partitions for tenants, and optional data aggregation queries. For example, graph operations can be based on a simple HTTP request. HTTP data communications conventionally operates with hypertext documents that include hyperlinks to resources that are easily accessible. A request message can include a request line, request header fields, and empty line, and an optional message body. In this way, the HTTP request syntax is valid for graph operations. The HTTP request can have comprehensive markup support in that the multi-tenant system allows any part of the HTTP request string to be marked up. In one example, any part of the HTTP request can be marked up with a query directive. For example, an SQLite lambda—an anonymous function in a relational database management system—can be a query directive. The query directive will alter or modify a response that is returned by an HTTP request once the HTTP request is evaluated on a server. In another example, any part of the HTTP request can be marked up with substitution tokens that are HTTP requests, lambdas, or a composition thereof; and are evaluated and string-replaced in the outer request so that further evaluation and processing may occur based on the results of a sub-operation.

The graph operations allows listing—for example include tenant identifiers corresponding to tenants—a set of unique data partitions (i.e., tenants in a cloud computing platform) to evaluate a graph language request and then use this information, alongside other metrics, as a hint to distribute a query load over a pool of backend machines. Graph operations further include support for both reads and writes. Reads and writes can be executed subject to tenant partitioning, on a backend service that spreads the work across the pool of machines. In addition, the graph operations supports providing optional aggregation query that—when interpreted on the server—can recursively merge results evaluated for each partition.

Currently, conventional multi-tenant systems are inefficient in supporting operations for user scenarios because developers have to code, ship, and maintain custom APIs for each user scenario that require API calls to backend services and basic composition, transformation, aggregation over the result of the API calls. Advantageously, the graph operations support receiving APIs call (e.g., HTTP request) and post-processing required, and then evaluating the HTTP request formulaically on the server and then returning any results. The graph operations further include support for tenant-partitioning and aggregation because it operates based on communicating various workloads. Workloads can be for active directory (e.g., Azure Active Directory "AAD") and a cloud-based mobile device management system (e.g., Intune). Data transformations can be executed for performing a similar operation over individual tenant partitions. Graph calls to each individual partitions can be performed using separate active directory token (e.g., AAD token) exchange.

Additional technical features of embodiments are described below by way of example. In particular, a graph language request can be submitted to perform graph operations for configuring tenants in a multi-tenant system. The graph language request can include HTTP-based graph language parameters having markup syntax attributes. The markup syntax attribute supports performing string replacement using replacement data. The replacement data can be output or adjusted output from an data API (e.g., a data API of a data and intelligence platform with a unified programmability model for accessing data associated with a cloud-based productivity tools). As shown below, the graph language request includes instructions to add user accounts created before the start of this year to the group named mygroup in all tenants (i.e., updating a tenant setting).

```
POST /beta/groups/[@id([/beta/groups?$filter=displayName eq
'mygroup'])]/members/$ref
{
    "@odata.id":"https://graph.microsoft.com/beta/directoryObjects/[@id([/beta/users
?$filter=createdDateTime le 2020-01-01T00:00:00Z])]"
}
Both [@id([/beta/groups?$filter=displayName eq 'mygroup'])] and
[@id([/beta/users?$filter=createdDateTime le 2020-01-
01T00:00:00Z])]
Executes { 1 (group) x N (users)} member add requests
```

The graph operations are executed based on a graph language. The graph language can be developed as an ANTLR (Another Tool for Language Recognition) grammar that provides a parser generator for reading, processing, executing, or translating structured text or binary files. The grammar can be used to parse and can be used to build and traverse parse trees. A parsing interface—supported via the graph language and grammar—receives a graph operations request (e.g., HTTP graph language request) and validates and tokenizes the graph operations request, and parses the results into a tree. The graph language also provides support for substitutable tokens that are delimited by a defined syntax (e.g., square brackets [ ]).

Graph operations requests are executed using graphs. The graphs can be generated as per-tenant execution graphs from parsed tokens. The graphs can include node, where each nodes fill its corresponding node buffer with string results. Each node further communicates progress information for nodes downstream. String replacement can be performed as a cross-product operation, which means a set of results from all but one upstream node is needed before a node can begin discarding input data. The graph language can support several operational features including: performing atomic operations (e.g., .NET interlocked class)—for variables that are shared by multiple threads—are implemented to minimize locking; asynchronous non-blocking functionality (e.g., async/await) implemented to reduce threading overhead; and streaming is implemented to reduce memory consumption.

The graph language further supports anonymous functions (e.g., lambda function or lambda abstraction) for providing functions that are not bound to an identifier. Anonymous functions are provided as lambda nodes that execute and load input data into in-memory tables of a database management engine (e.g., SQLite tables (arg0 . . . argN)). The lambda nodes can execute user-specified query on the in-memory tables to product a set of output strings.

Referring to:

```
POST /beta/groups/[@id([/beta/groups?$filter=displayName eq
'mygroup'])]/members/$ref
```

-continued

```
{
    "@odata.id":"https://graph.provider.com/beta/directoryObjects/[@id([/beta/users?
$filter=createdDateTime le 2020-01-01T00:00:00Z])]"
        The function @id is used to extract object ids from JSON payload. For example,
a SQLite query may be executed as shown below:
        select value
        from arg0, json_tree(arg0.data) as arg0
        where arg0.key = 'id'
```

As discussed, a database management engine (e.g., SQLite) can be used to transform JSON responses into a set of strings. Operationally, the SQLite operations can support flexible JSON to string [ ] transformations. And, user-specified queries can be easily executed and evaluated because the input data is transmitted to a database that can be queried. Moreover, security issues are mitigated by using an in-memory connection string—without data persistence—via the SQLite engine. The SQLite supports user-friendly data processing functionality and SQLite statement can be tested locally against API server responses in accessible interfaces (e.g., database browser interface). It is contemplated that the implementation with SQLite is not limiting and the graph language and functionality is compatible with language binding APIs that provide glue code specifically made to allow the graph language to use a foreign library (e.g., C#, JS, etc.) or operating system service that is not native to the graph language.

Overview of Exemplary Environments for Providing Graph Operations in a Multi-tenant System Aspects of the technical solution can be described by way of examples and with reference to FIG. 1A, FIG. 1B, FIG. 1C, FIG. 2A and FIG. 2B. FIG. 1A is a block diagram of an exemplary technical solution environment, based on example environments described with reference to FIGS. 6 and 7 for use in implementing embodiments of the technical solution are shown. Generally the technical solution environment includes a technical solution system suitable for providing the example multi-tenant system 100 in which methods of the present disclosure may be employed. In particular, FIG. 1A shows a high level architecture of the multi-tenant system 100 in accordance with implementations of the present disclosure. Among other engines, managers, generators, selectors, or components not shown (collectively referred to herein as "components"), the technical solution environment of multi-tenant system 100.

In operation, the graph operations engine accesses a graph language request comprising a first tenant identifier of a first tenant and a second tenant identifier of a second tenant; and a definition of data operations that execute the graph language request on the first tenant and the second tenant, the definition of data operations comprising a first definition parameter of a first data operation and a second definition parameter of a second data operation (e.g., a graph language request comprising a list of tenants identified in the graph language request and a definition of data operations that execute the graph language request on the list of tenants). Using each of a plurality of the computing nodes, the data operations of the definition that cause updating tenant data of the list of tenants are executed, the one or more data operations are assigned to corresponding computing nodes of the plurality computing nodes. Executing the data operations comprises performing at least two of the following: composing the data operations using one or more request parameters of a first command library and one or more request parameters of a second command library; transforming the data operations of the definition into a tree of data operation nodes that each accept and return data corresponding to the data operations; and aggregating, using an aggregation definition of the graph language request, a plurality of results of the data operations into a consolidated result set. The plurality of nodes further generate, for the graph language request, a set of results that are based on executing the one or more data operations, and then storing the set of results.

In addition, the graph language request can be implemented using an Application Programming Interface server, a plurality computing nodes in an interconnected ring network, a plurality of databases. The API server that receives and communicates the graph language request to a coordinator node of a plurality of computing nodes, the coordinator node operates as a root node that operates with a plurality of leaf nodes—from the plurality of computing nodes—to execute the graph language request. Executing data operations of the graph language request can further be based on tenant-partitioning and aggregation support for data of diverse workload that are retrieved via a set of data intelligence APIs.

With reference to FIG. 1A, FIG. 1A is an example system (i.e., multi-tenant system 100) for providing graph operations in accordance with embodiments of the present disclosure. Multi-tenant system 100 provides components, instructions, and operations for providing graph operation engine services using the following: HTTP client 110, API server 120, database engine 130, coordinator 140A, a plurality of databases (i.e., SQL 150A, SQL 150B, SQL 150C, and SQL 150D) a plurality of data APIs (i.e., data API 738A, data API 738B, and data API 738C). Each computing resource identified above can be associated with a multi-tenant system process or graph operations engine process through which the graph language request flows. Some computing resources may interchangeably perform graph operations (i.e., interchange their individual role across different graph language requests). For example, the coordinator node selected for one graph language request might become the leaf node on a subsequent request. Multi-tenant system 100 provides and performs improved graph operation engine services including graph operations and interfaces to support the functionality of technical solution in a technical solution environment having components described herein with reference to FIG. 6 and FIG. 7.

Data flow may be bidirectional data flows (i.e., request then response) or unidirectional data flows (i.e., a request without an immediate response). For example, bidirectional data transmission configured to occur over an HTTP network channel and unidirectional data transmission can be expected to occur over a TCP channel; however, the specific implementation described herein is not meant to be limiting. While the example disclosed below describes dedicated computing resources (e.g., unique machines) that perform specific processes; however other variations and combination of computing resources and machines for executing processes are contemplated in accordance with embodiments described herein. External APIs (i.e., data APIs: data API 738A, data API 738B, data API 738C) and the database engines (e.g., database engine 130) that support accessing tenant data (e.g., tenant partitions) via a dataflow between processes and external API. The processes can use in-memory SQL databases in dataflow between the SQL databases and process nodes. It is contemplated that data from data flows can be configured to not transit a network boundary, leverage in-memory SQLite databases, and be available local to process memory.

With continued reference to FIG. 1A, at step 10, a client (e.g., HTTP Client 110) communicates a graph language request ("request") to API Server. Client 110 can operate based on HTTP (Hypertext Transfer Protocol) that is an application layer protocol for distributed, collaborative, hypermedia information systems. Using the HTTP, client 110 communicates the graph language request—for example a user-issued graph language request—to an API server (e.g., API server 120). The request may contain graph language request parameters that support executing the graph language request. The graph language request parameters can include a list of tenants (or customers) for which the request will be issued and a definition that indicates the data operations that will be performed against each tenant.

Operationally, the list of tenants can correspond to a list of data partitions against which the request will be issued. In one implementation, a data APIs can be used to retrieve the data partitions that may be partitioned using an identifier (e.g., Tenant-ID). The definition may be a free-form string that is interpreted by a graph language grammar. In one example, the string corresponds to a graph language parameter of a first command library that is annotated using a graph language parameter of second command library. For example, the string resembles a HTTP request and can be annotated with SQL statements describing how to process the data resulting from that request. The graph language allows for recursive nesting of SQL statements and HTTP requests so that data produced by one request or SQL statement can be submitted as input to a subsequent HTTP request or SQL statement.

The definition string may be transformed into a tree of data operation nodes that each accept and return an array of string values. The tree of data operation nodes can be evaluated from leaf node to root node by performing the data operation specified at each node. The data operation of a node can be performed against data received from the node's children—the leaf layer of the operation tree has no such inputs. Data is propagated from child nodes to parent nodes and execution of a node begins whenever any child nodes have returned data including incomplete input data. The data can be defined in an array of string values. As such, each node in the tree can operate to accept and return data in the form of as an array of string values. The result of evaluating the entire operation tree can be buffered in the root node of the tree as an array of string values.

The graph language can support different types of data operations that can be executed against inputs. The first data operation is executed via a node associated with data APIs. For example, a node issues HTTP requests using a relative URL against a data API. Authentication can be performed using a user account API server token and the computing network domain server. Results are returned and buffered into an array of string values for further evaluation in the tree.

The second data operation is a database query (e.g., SQLite query). Operationally, input from child nodes is loaded into one or more data tables (e.g., SQL lite data tables). A SQL statement can be executed against the data tables. Node results can be configured to be retrieved from a single-column SELECT statement. The data tables storing the data tables can be configured to be can be ephemeral (disappear immediately after node data is processed) or persist within a process for the lifetime of a request (used for advanced data processing and aggregation).

The third data operation is a terminal statement. Terminal statements support several different graph operations capabilities. Terminal statements provide the ability to issue multiple statements in a single request (i.e.: a string[ ] of statements can be accessed, each statement having its own pipeline). As used herein, a pipeline, also known data pipeline, can refer to a set of data processing elements connected in series, where the output of one element is the input of the next one. The elements of a pipeline are often executed in parallel or in time-sliced fashion. Other variations and combinations of executing terminal statements are contemplated with embodiments described herein. Terminal statements also allow the persistence of variables across statements in SQLite (e.g.: read/write). And terminal statement provide support for executing conditional logic by presence/absence of empty-string replacement (e.g.: exists/notexists).

With reference to the sample code below, terminal statements are used to execute more than one pipeline in a row and share data between a first pipeline and a second pipeline. In one example, the terminal statement can be combined with an SQLite lambda statement to construct an if statement. For example, if a condition is true, then an empty string or an actual parameter is replaced; otherwise, a null value stops the next HTTP requests or lambda from being evaluated.

```
Values = new List<string>( )
//check exists
@$@sys.write([@sys.project([/FolderPath/$filter-displayName eq '{displayName}
//exists case...
@$"PATCH /folderPath/[@sys.read(""existingPolicyID"")] \ {{ ""@data.type"":
@$"POST /folderPath/[@sys.read(""existingPolicyID"")]/assign \ {{""assignments
// not exist case...
@$"@sys.write([@sys.project([POST/folderPath["@sys.notexists (""exisitingPolicyId
@$POST /folderPath/[@sys.read(""newPolicyId"")]/assign \ {{""assignments"" :[[
@"@sys.write (@sys.read (""existingPolicyId"")], ""finalId"")"
@"@sys.write ([@sys.read(""newPolidcyId"")], ""finalId"")"
@"@sys.read (""finalId"")"
}
```

As shown above, the terminal statement supports a check exist statement that executes a first set of operations in the //exists case and second set of operations in the // not exist case. Executing either the first set of operations of the second set of operations causes generation of a set of results that can be combined with additional results in a result at a leaf node level or a root node level.

It is contemplated that the implicit sequencing and pipelining of data between each data operation type can itself be thought of as a data operation. The result (e.g., root node result) of executed data operations of the definition can be the array of string values resulting from the execution of data operations. For example, the array of string values may be associated with a tree a user-defined tree associated with the graph language request. The graph language supports nest operations. Nest operations are supported so that results are evaluated sequentially. For example, the results from nest operations can be evaluated from innermost expression to outermost. The graph language further supports substitution tokens that are evaluated and replaced at runtime. For example, a graph language request can include embedded substitution tokens that are evaluated and replaced at runtime.

Figure 1B:
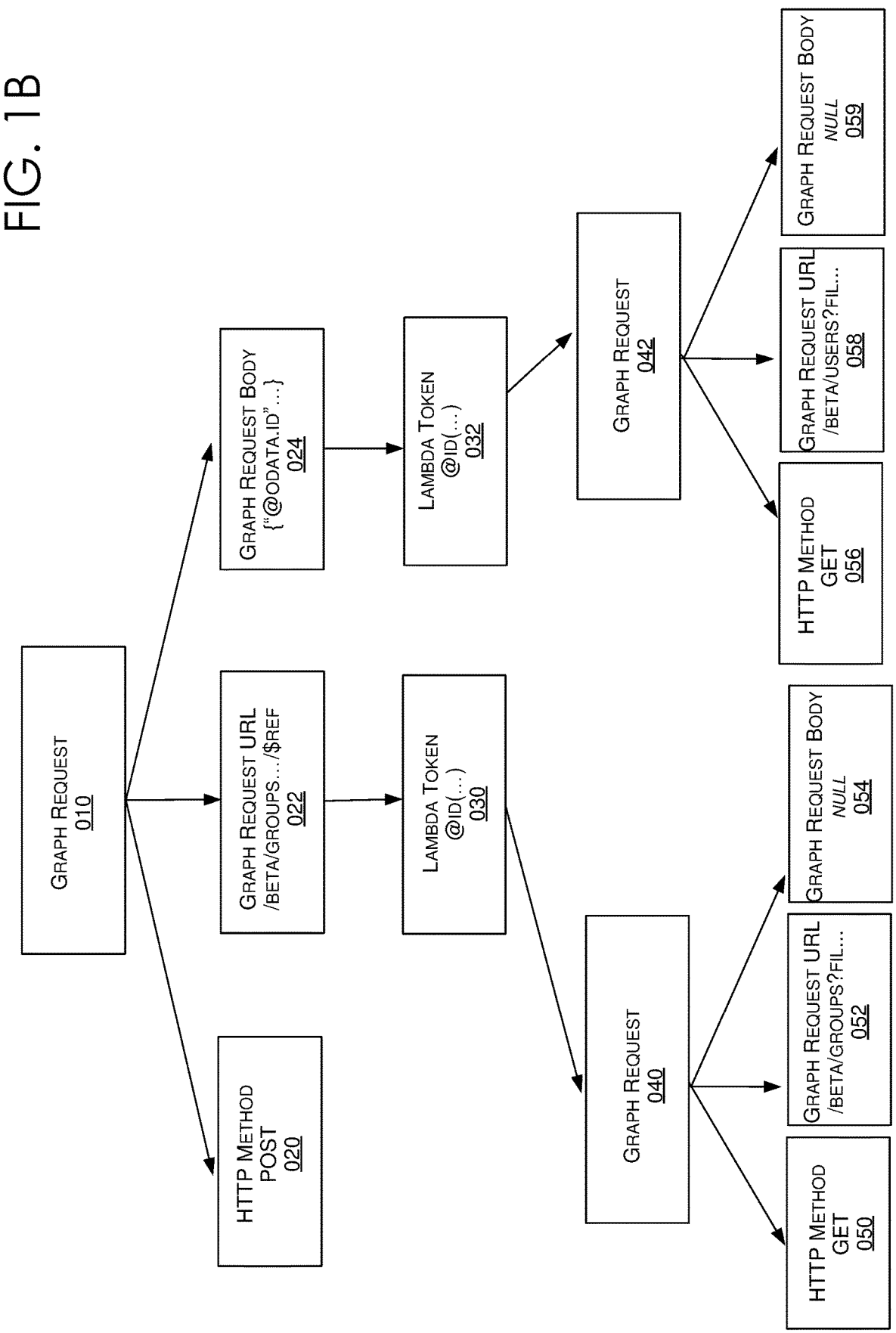
Figure 1C:
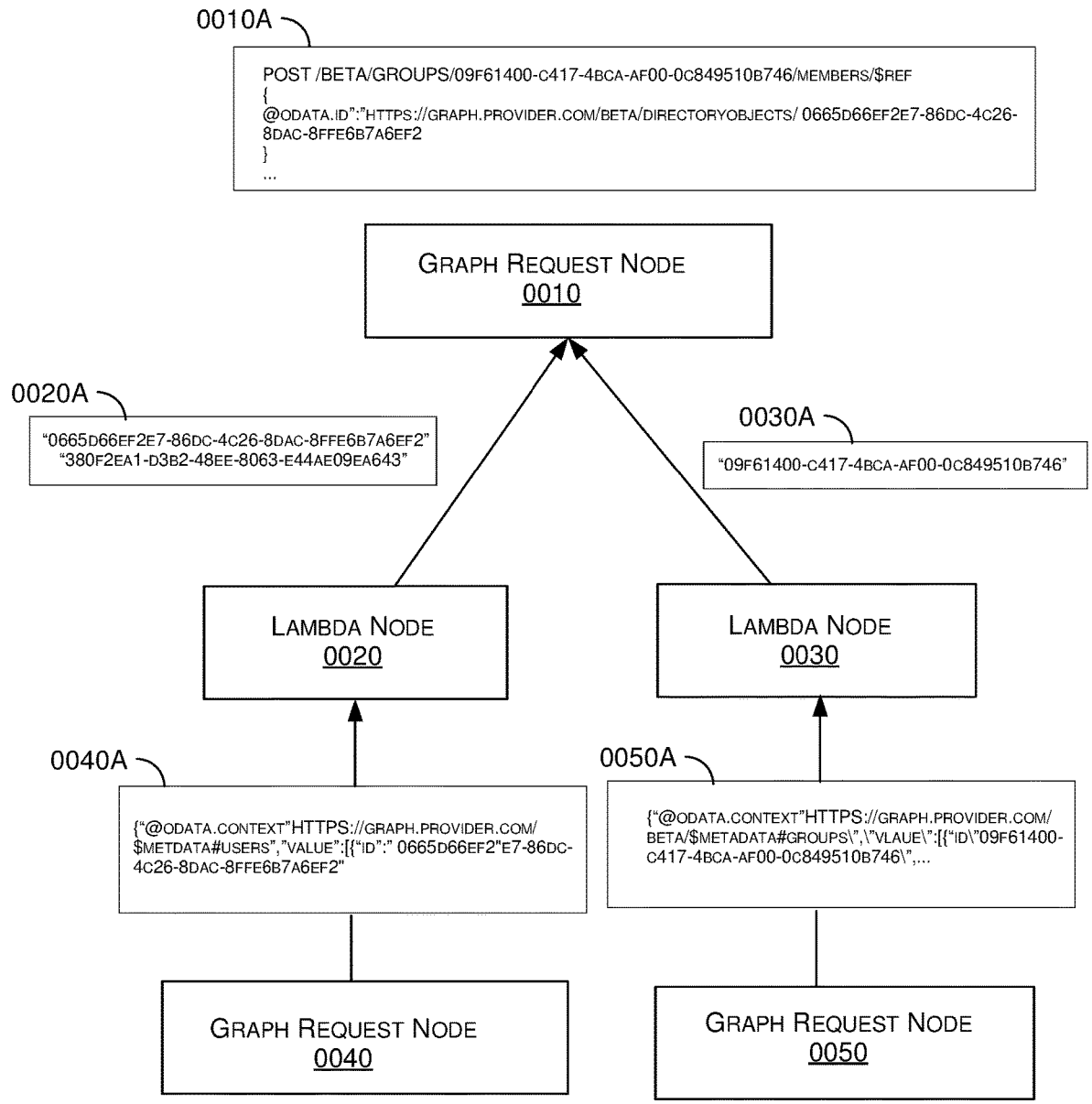

With reference to FIGS. 1B and 1C, graph language request with the definition specified in FIG. 1B, the request is constructed such that when executed the request adds user accounts to an computing network domain group resolved at runtime named "mygroup". The list of user accounts to add may be computed at evaluation time through a dynamic query against data APIs (i.e.: user accounts created in the given tenant after 1/1/2020).

```
POST /beta/groups/[@id([/beta/groups?$filter=displayName eq
'mygroup'])]/members/$ref
 {
   "@odata.id":"https://graph.microsoft.com/beta/directoryObjects/[@id([/beta/users
?$filter=createdDateTime le 2020-01-01T00:00:00Z])]"
 }
```

The grammar can support different syntax for the substitution tokens. For example, each substitution token may appear within square brackets and is evaluated to one or more result string values. The innermost tokens in this case, (e.g., [/beta/groups?$filter=displayName eq 'mygroup'" and /[@id([/beta/users?$filter=createdDateTime le 2020-01-01T00:00:00Z]) are data API requests against/beta/groups and/beta/users. The results of these HTTP calls are transmitted to a SQLite function (@id), highlighted in the [@id] token, that projects only the data API id of the objects returned in the HTTP response. Once the [@id] tokens are resolved to string values, the resulting values are replaced in the outermost HTTP request (i.e., @odata.id":"https:// graph.microsoft.com/beta/directoryObjects and/members/ $ref) which executes a variable number of times based on the number of user accounts and groups resolved. In general, a chain of string evaluations and substitutions continues until no further evaluations and substitutions are required by the request.

In one implementation, when two substitution tokens occur within the same string, the substitutions tokens are evaluated in cross-product fashion. For example, in the string "[@f([ ])] [@g([ ])]", if the lambda @f returns "a" and "b" and the lambda @g returns "c" and "d," then four strings total will result from the data operation: {"a c", "a d", "b c", "b d"}. These will be propagated to the caller.

The graph language supports an aggregation definition field ("aggregation definition") for consolidating results across tenants. A value of the aggregation definition field indicates how individual array-of-string results from one or more tenants (or partitions) can be consolidated into a single result. The aggregation definition field can be evaluated using the same syntax and grammar as the definition field. The aggregation definition field can include SQLite Lambda operations over a "special" HTTP request, [/result], which represents the results of running the Definition value on one or more tenants. A value of the aggregation definition field is used (or executed) in data operations within both the leaf node and coordinator node processes (i.e., leaf process and coordinator process) while the a value of the definition is used (or executed) only on Leaf nodes. In one implementation, the aggregation definition field is executed once on each leaf process (after all per-tenant data is generated from executing the definition) and then one or more times on the coordinator process (as each leaf process returns data to the coordinator).

Turning to FIG. 1A, at step 20, the API server 120 selected a coordinator (i.e., coordinator 140A). Operationally, the request is received by the API server 120. The API server 120 validates the request for basic syntax. The API server 120 communicates the request to the coordinator 140A. The coordinator 140A may be randomly selected from an interconnected ring of servers. The graph operations can support process discovery and election of a coordinator.

At step 30, the coordinator 140A implements a process that distributes the graph language request. The coordinator 140A parses the graph language request. The coordinator 140A can further subdivide the tenant list across one or more graph language servers that it designates to be leaf nodes. Operationally, in one embodiment, the request is cloned and forwarded to leaf nodes (i.e., leaf node 140B, leaf node 140C, and leaf node 140D) with the subset of tenant identifiers applicable to that node. A timer may be started to limit the duration for which the coordinator 140A will await a response from each leaf process. The graph operations can include process discovery mechanism to enumerate all available graph language processes.

Tenants (e.g., via tenant identifiers) can be mapped to leaf node using a first mapping operation (i.e., proportional mapping) and a second mapping operation (i.e., cost metric mapping). With proportional mapping, tenants are distributed proportionally across the set of graph nodes available (e.g.: 10 tenants/2 available leaf nodes=5 tenants per leaf node). With cost metric mapping, tenants are distributed such that a cost metric is equalized across the set of graph nodes available. The cost metric that we use is an exponentially weighted moving average of process thread count. We currently assume that each tenant assigned to a leaf process will incur a constant increase in thread count, but it is possible to implement a variable cost model based on metadata.

As an example, suppose we wish to execute a graph language request for 5 tenants using 2 Leaf processes. Assuming the request will add a constant cost of 4 threads per-tenant and that the current thread count values are {Leaf$_1$=15, Leaf$_2$=0}, the coordinator process will distribute 1 request to Leaf$_1$ and 4 requests to Leaf$_2$ (equalizing thread counts at 20 per node). Note that, to enable this calculation, each graph language process broadcasts its current thread count to all other discovered processes over TCP.

At step 40, the definition and aggregation definition is evaluated on leaf nodes. The graph language requested definition field is evaluated for each tenant assigned to the leaf (e.g., leaf node 140B, leaf node 140C, and leaf node 140D). Evaluating the request definition field can include intercommunication between external APIs (e.g., data API 738A, data API 738B, and data API 738C) and a database (e.g., in-memory SQLite database—SQL 150B, SQL 150C, and SQL 150D) that processes incoming results. Operationally, upon evaluating the definition to a result, for each individual tenant request, an aggregation definition, if specified, is applied to arrive at an aggregate result for the tenants assigned to the leaf node.

At step 50, leaf nodes (e.g., leaf processes on leaf nodes) write intermediate results (i.e., leaf node results) to a database engine (e.g., database engine 130). Per a set of data operations specified in the original graph language request, each leaf records information about the HTTP request/response (i.e.: URI, status code, response body) issued during evaluation of the definition. These intermediate results can be stored in the database engine 130 as entities—graph operation request entity—defined in the first command library (e.g., graph operation HTTP request entities). The final per-tenant result (e.g., a string array) may also be recorded if specified by the end-user. For example, the final per-tenant result can be a graph operation entity. At step 60, leaf node (e.g., leaf processes on leaf nodes) respond to coordinator 140A. After the definition and aggregation definition have been run in the leaf process on a subset of tenants, the response resulting from that subset is returned to the coordinator node 140A.

At step 70, the coordinator 140 (e.g., coordinator process) runs aggregation definition The coordinator 140 applies the aggregation definition on the results returned from each leaf process. The aggregation definition can be re-evaluated as each leaf result is returned. At step 80, the coordinator 140 (e.g., coordinator process) writes final results to the database engine. A final result, with processing statistics (e.g.: completed time, errors), is written to database engine 130 and returned to the API server 120. This result can be referred to as a graph operation entity. At step 90, the HTTP client 110 issues a supplemental data request to API server 120. For example, in one implementation, the API server 120 supports end-user queries for graph operation, graph operation result, and graph operation request entities. Some common reasons to retrieve these records include error handling, diagnostics, and auditing. At step 0100, the API server 120 retrieves supplemental data from the database engine.

FIGS. 1B and 1C illustrate how the graph language request is tokenized and processed. The graph language request (i.e., 0010A) can be associated with a plurality of tokens (i.e., 0020A, 0030A, 0040A, and 0050A) that are associated with corresponding nodes for executing data operations associated with the tokens. In operation, graph request 010 represents a graph language request received from a client. The graph language request includes graph language request parameters (e.g., an HTTP request and an SQLite Query annotating the HTTP request as a query directive). For example, HTTP method POST 020, graph request URL 020, graph request body 024, lambda token 030, and lambda token 032 represent tokens that are parsed from the graph language request. In particular, a coordinator node (e.g., coordinator node 140A of FIG. 1A) receives a graph language request (e.g., graph request 010) and tokenizes the graph language request. The coordinator node can also distribute at least portions of the graph language request (e.g., graph request 040 and graph request 042) and corresponding tokens (e.g., HTTP method GET 050, graph request URL 052, graph request body 054, HTTP method GET 052, graph request URL 058, and graph request body 059) to a plurality of leaf nodes to support executing data operations on corresponding tenant partitions.

As shown in FIG. 1C, graph request node 0040 and graph request node 0050 execute corresponding portions of the graph language request to generate an intermediate set of results of a first node level. Lambda node 0020 and lambda node 0030 can execute corresponding portions of data operations using the intermediate set of results from the first node level. It is contemplated that a subset of the intermediate set of results can be periodically streamed—from one or more leaf nodes in the plurality of leaf nodes—towards the root node in the tree of data operation nodes. Streaming the subset of intermediate results is based on a threshold subset of intermediate results (e.g., a threshold batch data size or count) that can support continuous parallel processing and execution of data operations through the hierarchy of nodes. The lambda node can further communicate intermediate set of results of a second node level to the graph request node 0010. The graph request node then generates a root node set of results. A set of results—used throughout—does not include a null set of results. As discussed herein, if an aggregation definition is provided, the root node uses instructions in the aggregation definition to consolidate the results into the root node set of results.

Figure 2B:
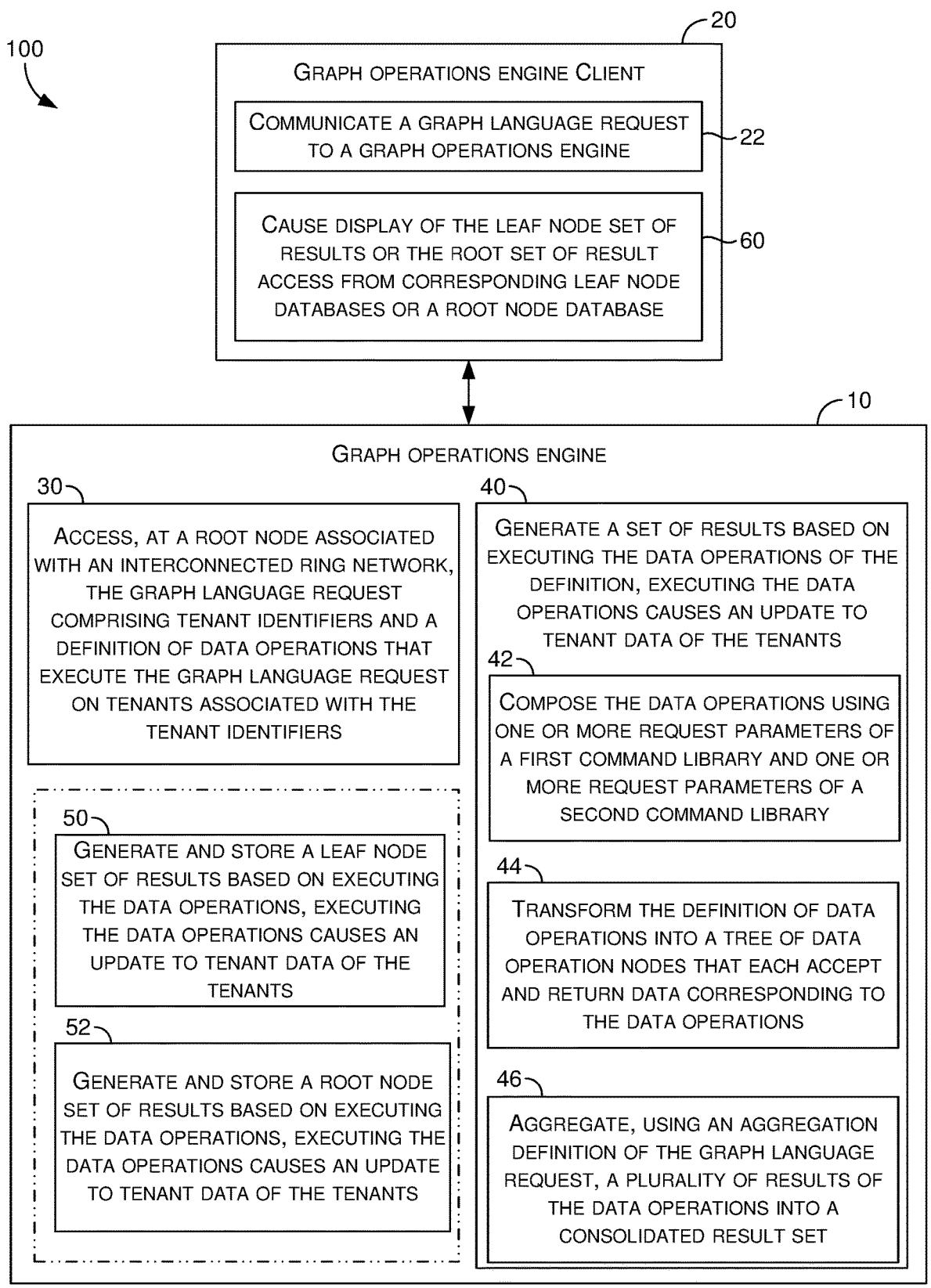

Turning to FIGS. 2A and 2B, FIGS. 2A and 2B are block diagrams of an exemplary technical solution environment, based on example environments described with reference to FIGS. 6 and 7 for use in implementing embodiments of the technical solution are shown. Generally the technical solution environment includes a technical solution system suitable for providing the example deployment system 100 in which methods of the present disclosure may be employed. In particular, FIG. 2A shows a high level architecture of the multi-tenant system 100 in accordance with implementations of the present disclosure. Among other engines, managers, generators, selectors, or components not shown (collectively referred to herein as "components"), the technical solution environment of deployment system 100 includes a graph operations engine 110, a graph operations engine client 120, Application Programming Interface server 130, ring network 140 having coordinator node 140A and leaf node 1140B, 140C, and 140D, database servers 150 having coordinator node database 150A, leaf node database 150B, leaf node database 150C, leaf node database 150D, and graph operation engine entities 150E stored in the databases, graph language engine 160 including the graph language grammar engine 160, and data intelligence API 170. The components in FIGS. 2A and 2B corresponding with components and functionality described herein with reference to FIGS. 1A, 1B, and 1C and additional descriptions of embodiments of the present disclosure.

At a high level, with reference to FIG. 2B, the graph operations engine client 20 operates to, at step 22 communicate a graph language request to the graph operations engine 10. The graph operations engine 10 operates to, at step 30, access at a root node associated with an interconnected ring network, the graph language request comprising tenant identifiers identified in the graph language request and the a definition of data operations that execute the graph language request on the list of tenants.

At step 40, the graph operations engine 10 generates a set of results based on executing the data operations of the definition that cause updating tenant data. Executing the data operations can include: at step 42, composing the data operations using one or more request parameters of a first command library and one or more request parameters of a second command library; at step 44, transforming the definition of data operations into a tree of data operation nodes. The node can each accept and return data corresponding to the data operations; and at step 46, aggregating, using an aggregation definition of the graph language request, a plurality of result of the data operations into a consolidated result set.

The graph operations engine 10 is further configured to, at step 50, generate and store a leaf node set of results (e.g., one or more leaf node set of results) based on executing the data operations of the definition, executing the data operations cause updating the tenant data, and at step 52, generate and store a root node set of results based on executing the data operations cause updating the tenant data, and at step 52, generate and store a root node set of results based on executing one or more data operations of the definition that cause updating the tenant data.

Functionality of the embodiments of the present invention have further been described, by way of an implementation and anecdotal examples, to demonstrate that the operations for providing graph operations that are an unconventional ordered combination of operations that operate with a graph operations engine as a solution to a specific problem in multi-tenant systems technology environments to improve computing operations and user interface navigation in multi-tenant systems. Advantageously, the embodiments described herein improve the computing operations, functionality, and the technological process for providing the functionality described herein. Overall, these improvements result in less CPU computation, smaller memory requirements, and increased flexibility in multi-tenant systems.

Figure 3:
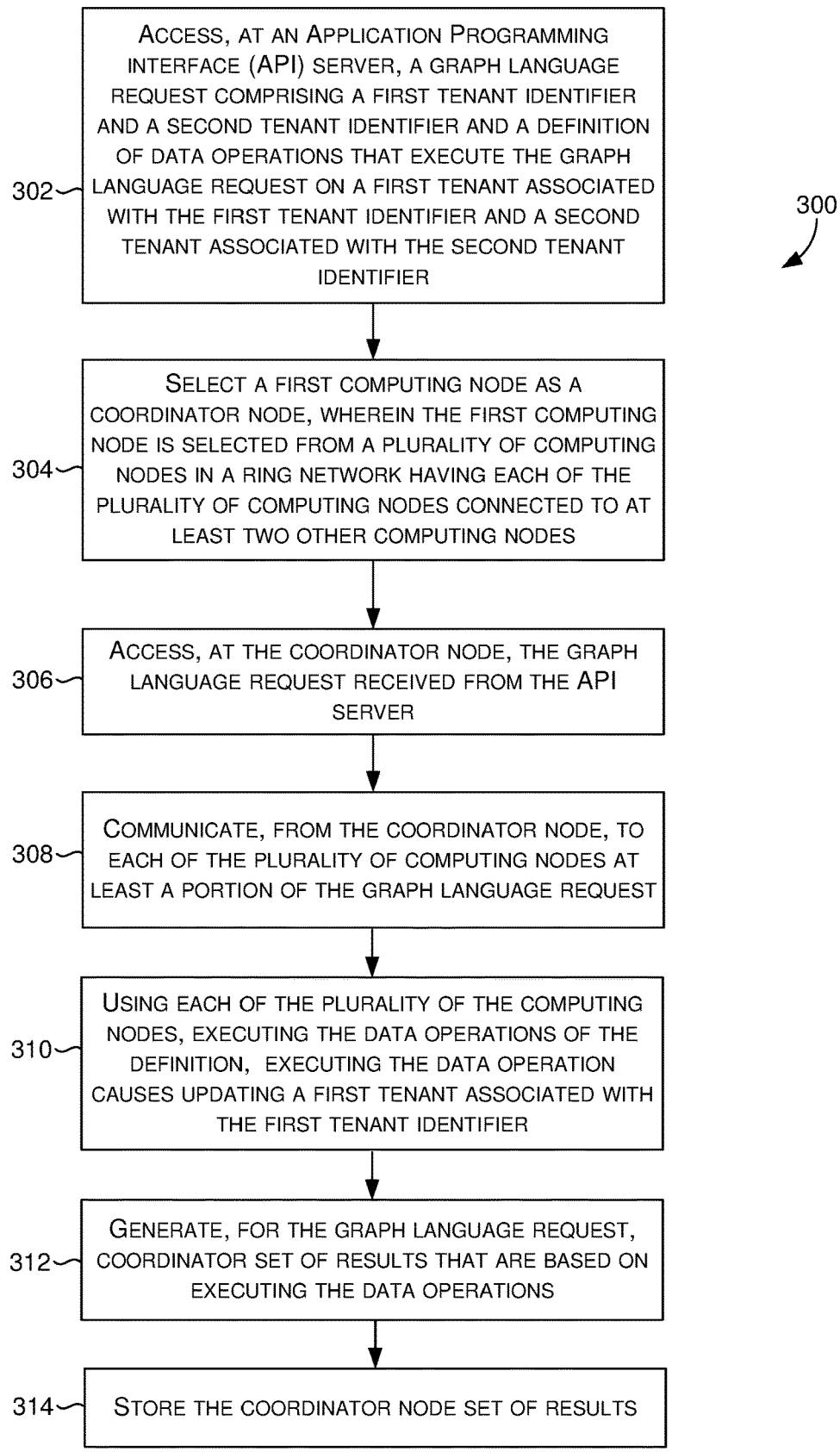
FIG. 3 provides a first exemplary method of providing graph operations using a graph operations engine in a multi-tenant system, in accordance with aspects of the technology described herein.
Figure 4:
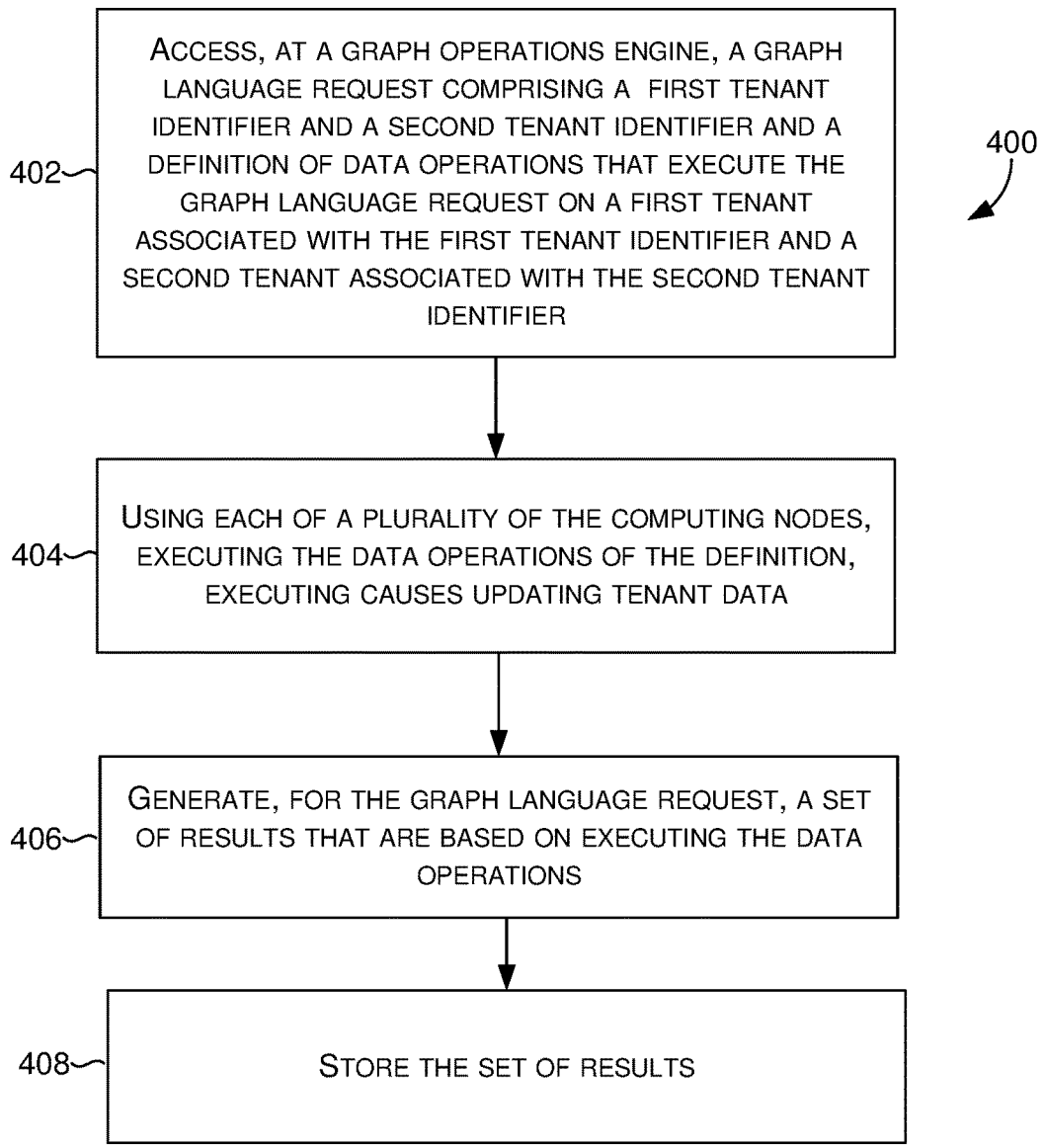
FIG. 4 provides a second exemplary method of providing graph operations using a graph operations engine in a multi-tenant system, in accordance with aspects of the technology described herein.
Figure 5:
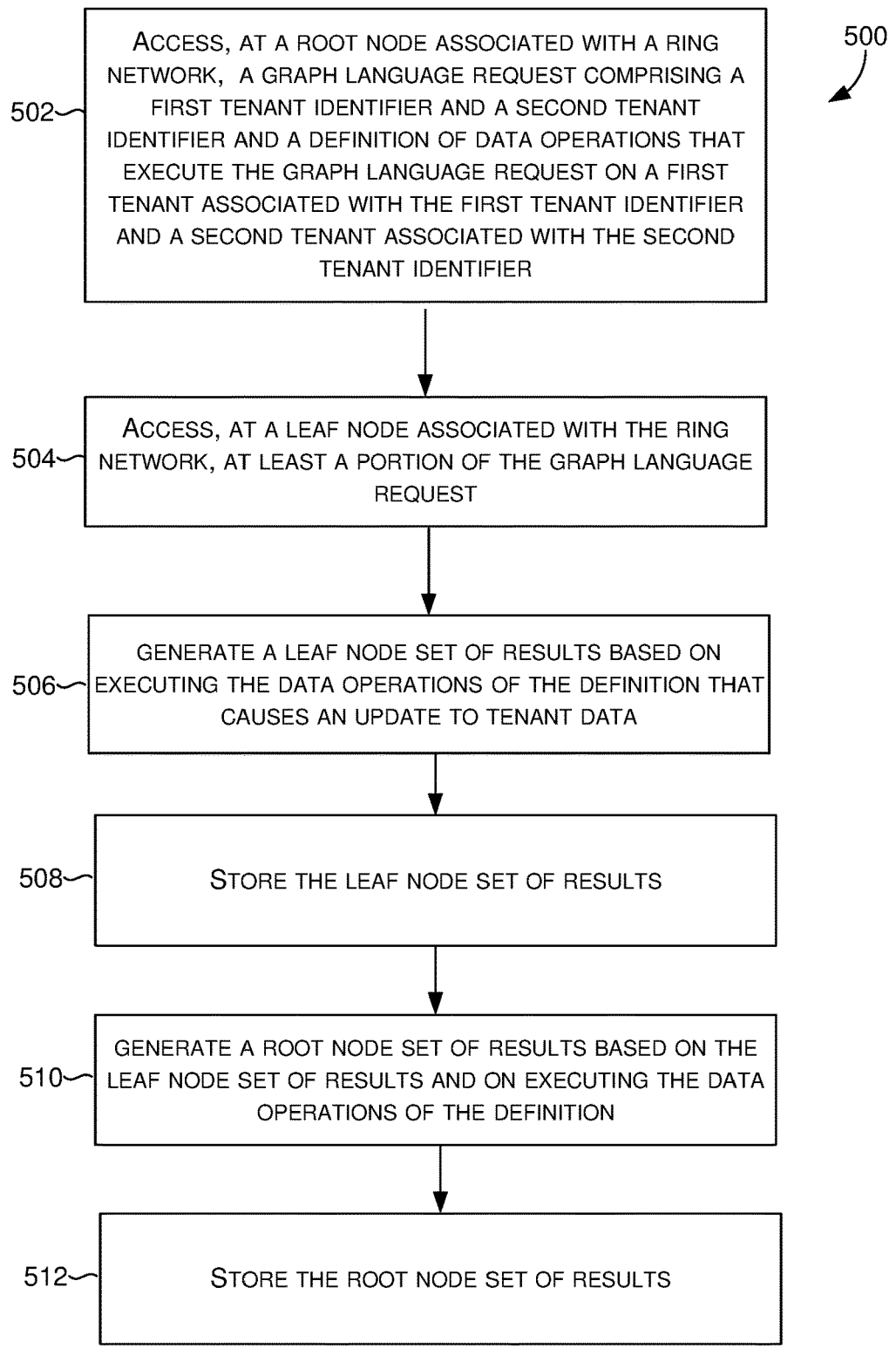
FIG. 5 provides a third exemplary method of providing graph operations using a graph operations engine in a multi-tenant system, in accordance with aspects of the technology described herein.

Exemplary Methods for Providing Tenant Management Based on Graph Operations in a Multi-Tenant System With reference to FIGS. 3, 4 and 5, flow diagrams are provided illustrating methods for providing graph operations for tenant management in a multi-tenant system. The methods may be performed using the multi-tenant system described herein. In embodiments, one or more computer-storage media having computer-executable or computer-useable instructions embodied thereon that, when executed, by one or more processors can cause the one or more processors to perform the methods (e.g., computer-implemented method) in the multi-tenant system (e.g., a computerized system or computing system).

Turning to FIG. 3, a flow diagram is provided that illustrates a method 400 for providing graph operations for tenant management in multi-tenant system. At block 302, an API server accesses a graph language request comprising a first tenant identifier of a first tenant and a second tenant identifier of a second tenant, and a definition of data operations that execute the graph language request on the first tenant and the second tenant. The graph language request can further include an aggregation definition that includes instructions on how to consolidate a plurality of results of the data operations into a consolidated result set. At block 304, a first computing node as coordinator node is selected, the first computing node is selected from a plurality of computing nodes in a ring network having each of the plurality of nodes connected to at least two computing nodes of the plurality of computing nodes. At block 306, the coordinator node accesses the graph language request received from the API server. At block 308, the coordinator node communicates at least a portion of the graph language request to each of the plurality of computing nodes. At block 310, each of the plurality of the computing nodes executes that data operations of the definition, executing the data operations causes updating the one or more tenant configuration.

Executing the data operations can include the following:

Composing the data operations using one or more request parameters of a first command library, one or more request parameters of a second command library, the one or more request parameters of the first command library are annotated using the one or more request parameters of the second command library having first data operation processing instructions;

Transforming the data operations of the definition into a tree of data operation nodes; the nodes configured to each accept and return data corresponding to the data operations;

Aggregating, using the aggregation definition of the graph language request, a plurality of results of the data operations into a consolidated result set; and Streaming, at least periodically, a subset of intermediate results from one or more leaf nodes in the plurality of leaf nodes toward the root node in the tree of data operation nodes, where streaming the subset of intermediate results is based on a threshold subset of intermediate results.

At block 312, a coordinator node set of results are generated based on executing on the one or more data operations. At block 314, the coordinator node set of results are stored.

Turning to FIG. 4, a flow diagram is provided that illustrates a method 400 for providing graph operations using a graph operations engine in a multi-tenant system. At block 402, a graph operations engine access a graph language request comprising a first tenant identifier and a second tenant identifier and a definition of data operations that execute the graph language request on a first tenant associated with the first tenant identifier and a second tenant associated with a second tenant identifier. At block 404, using each of a plurality of the computing nodes, executing the data operations of the definition that cause updating tenant data of the first tenant and the second tenant. Executing the data operations comprises composing the data operations using one or more request parameters of a first command library, one or more request parameters of a second command library. The one or more request parameters of the first command library are annotated using the one or more request parameters of the second command library having instructions on how to process results generated from executing the data operations.

The first command library can be based on a Hypertext Transfer Protocol ("HTTP") and wherein the second command library is based on Structured Query Language (SQL), where a first request parameter of the first command library is an HTTP request and a first request parameter of the second command library is an SQLite statement. The HTTP request is annotated with the SQLite statement as a query directive that modifies a response that is returned by the HTTP request. At block 406, a set of results are generated based on executing the one or more data operations. At block 408, the set of results are stored.

Turning to FIG. 5, a flow diagram is provided that illustrates a method 500 providing graph operations using a graph operations engine in a multi-tenant system. At block 502, a root node associated with a ring network, accesses a graph language request comprising a a first tenant identifier and a second tenant identifier and a definition of data operations that execute the graph language request on the list of tenants. The graph language of the graph language request supports each of the following:

Recursively nesting a first request parameter of the graph language request corresponding the first command library or a first request parameter of the graph language request corresponding to the second command library, where recursively nested portions of the graph language request are submitted as input when executing data operations of the definition; substitution tokens that are evaluated and string-replaced causing generation of one or more result string values; a first data operation as second data operation, where first data operation is executed using one or more data APIs that provide data, the data is replacement data in string replacement operations, and the second data operation is executed using a database query, where a leaf node set of results that is stored in in-memory SQL data tables are accessed to generate results for the database query.

At block 504, a leaf node, as associated with the ring network, accesses at least a portion the graph language request. At block 506, the leaf node generates a leaf node set of results based on executing one or more data operations of the definition that cause updating the tenant data. At block 508, the leaf node set of results are stored. At block 510, the root nodes generates a root node set of results based on the leaf node set of results and on executing the one or more data operations of the definition. At block 512, the root node set of results are stored. The results are stored as one of the following graph operation engine entities: graph operation entity, graph operation result entity, and graph operation request entity—and are retrievable as supplemental data.

Example Distributed Computing System Environment

Figure 6:
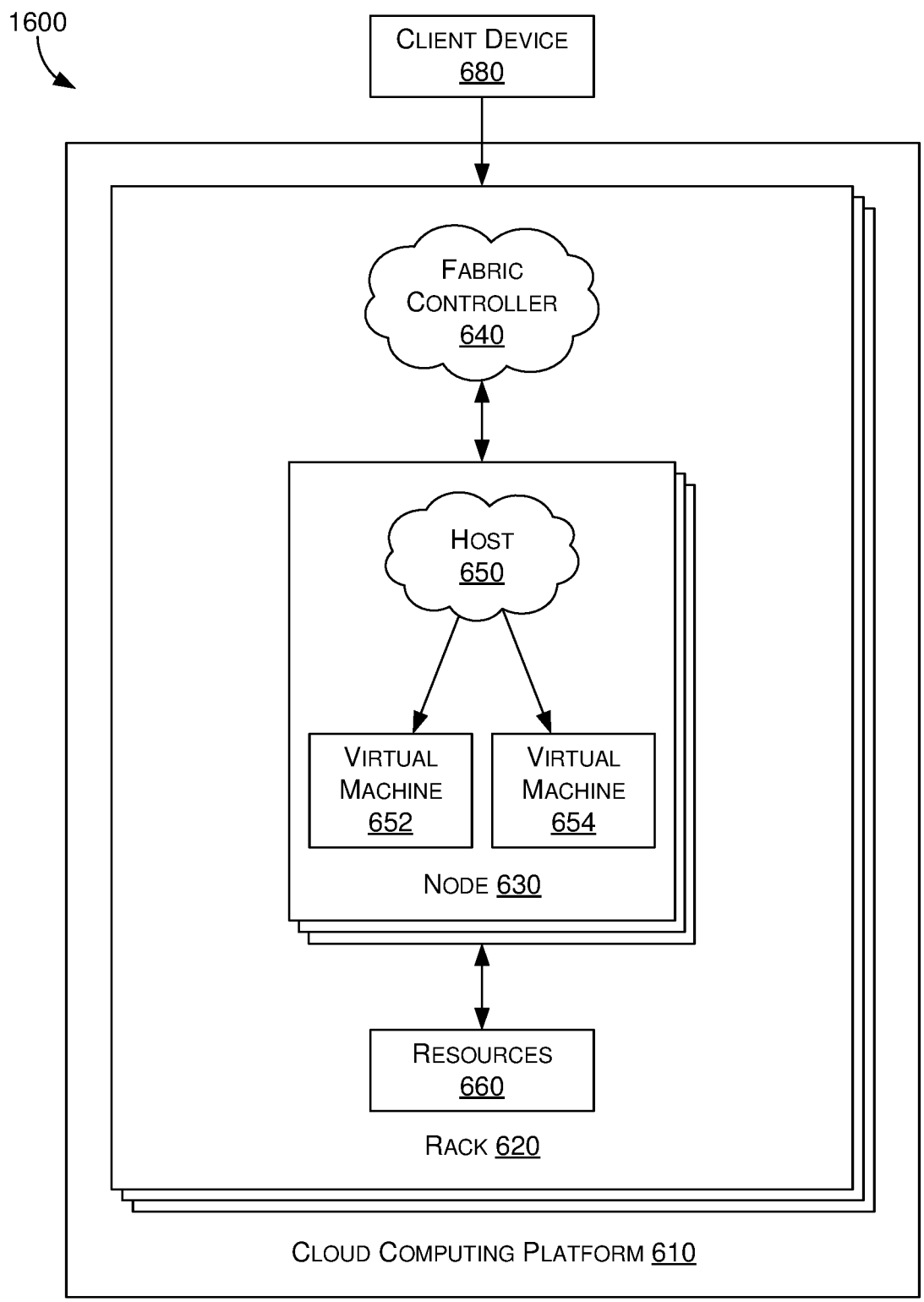
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Distributed Computing Environment

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
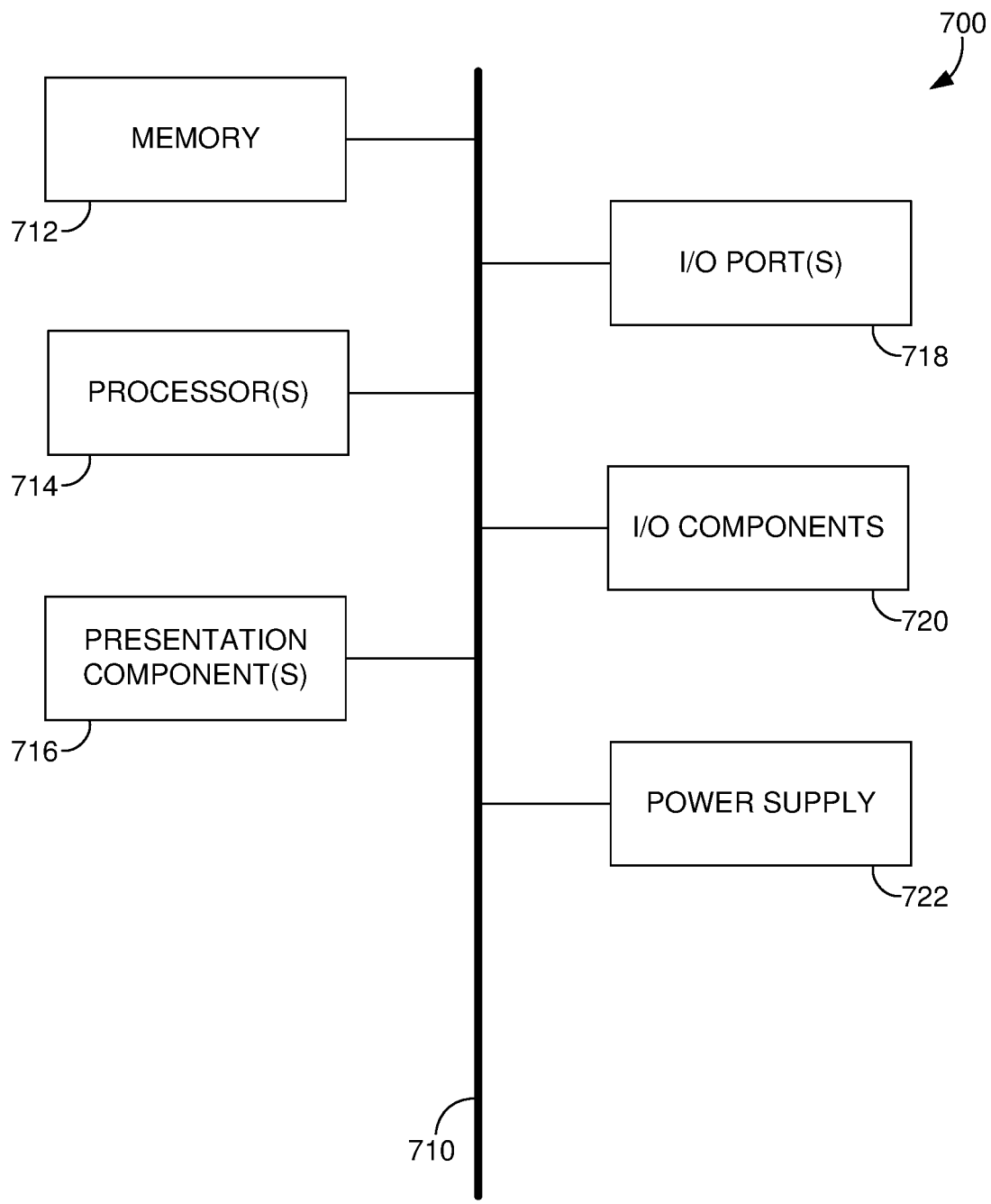
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method, the method comprising:
   accessing, at a graph operations engine, a graph language request comprising:
     (a) a first tenant identifier of a first tenant and a second tenant identifier of a second tenant, wherein the first tenant identifier and the second tenant identifier each identify corresponding first tenant data and second tenant data on a computing device of a cloud computing platform; and
     (b) a definition of data operations that execute the graph language request on the first tenant and the second tenant, the definition of data operations comprising a first definition parameter for a first data operation and a second definition parameter for a second data operation,
   the first definition parameter identifies a first command library and a second command library associated with composing the first data operation,
   the second definition parameter identifies the first command library and the second command library associated with composing the second data operation;
   based on the first definition parameter, accessing a first command library request parameter of the first command library and a second command library request parameter of the second command library, wherein the first command library request parameter comprises an annotation defined using the second command library request parameter,
   the second command library request parameter annotates the first command library request parameter with processing instructions for how to process results generated from executing the first data operation;
   composing the first data operation using the first command library request parameter and the second command library request parameter;
   based on the second definition parameter, accessing a first command library second request parameter and a second command library second request parameter;
   composing the second data operation using the first command library second request parameter and the second command library second request parameter;
   communicating the first data operation to a first computing node and the second data operation to a second computing node;
   executing, via the first computing node, the first data operation, wherein executing the first data operation causes an update to the first tenant data associated with the first tenant identifier;
   executing, via the second computing node, the second data operation, wherein executing the second data operation causes an update to the second tenant data associated with the second tenant identifier;
   based on executing the first data operation and the second data operation, generating a consolidated result set based on a first set of results associated with the first data operation and the first tenant, and a second set of results associated with the second data operation and the second tenant; and
   communicating the consolidated result set to a graph operations engine client to cause display of the consolidated result set.

2. The method of claim 1, wherein the graph language request further comprises an aggregation definition that includes instructions on how to consolidate a plurality of results of the data operations into the consolidated result set, wherein executing the data operations via a plurality of computing nodes that accept and return results data further comprises aggregating, using the aggregation definition of the graph language request, the plurality of results of the data operations into the consolidated result set.

3. The method of claim 1, wherein the graph language request comprises graph language request parameters of a graph language grammar that supports composing the data operations, transforming the definition of data operations into a tree of data operation nodes, and aggregating a set of results from the tree of data operation nodes.

4. The method of claim 1, wherein the first command library is based on a Hypertext Transfer Protocol ("HTTP") and wherein the second command library is based on a Structured Query Language (SQL),
   wherein a request parameter of the first command library is an HTTP request and a request parameter of the second command library is an SQLite statement, wherein the HTTP request is annotated with the SQLite statement as a query directive that modifies a response that is returned by the HTTP request.

5. The method of claim 1, wherein the graph language further supports each of the following:
   recursively nesting the first command library request parameter of the graph language request or the second command library request parameter of the graph language request, wherein recursively nested portions of the graph language request are submitted as input when executing data operations of the definition;
   substitution tokens that are evaluated and string-replaced causing generation of one or more result string values;
   a first data operation type executed using one or more data APIs that provide data, the data is replacement data in string replacement operations;
   a second data operation type executed using a database query, wherein a leaf node set of results that is stored in in-memory SQL data tables are accessed to generate results for the database query; and a third data operation type executed using a terminal statement associated with a first pipeline and a second pipeline, wherein at least a portion of data is associated with executing the first pipeline and the second pipeline is shared between the first pipeline and the second pipeline.

6. The method of claim 1, wherein executing the data operations of the definition further comprises periodically streaming a subset of intermediate results, from one or more leaf nodes in a plurality of leaf nodes that execute the data operations, towards a root node in a tree of data operation nodes representing the data operations of the definition, wherein streaming the subset of intermediate results is based on a threshold subset of intermediate results.

7. The method of claim 1, wherein the graph operations engine is associated with a graph operations engine client, an Application Programming Interface (API), a plurality of computing nodes in an interconnected ring network, a plurality of databases each associated to a computing node in the plurality of computing nodes that support executing the data operations to generate results,
 wherein the results associated with data operations are stored as one of the following graph operations engine entities: graph operation entity, graph operation result entity, and graph operation request entity, wherein the graph operations engine entities are retrievable as supplemental data.

8. A computerized system comprising:
one or more computer processors; and
computer memory storing computer-useable instructions that, when used by the one or more computer processors, cause the one or more computer processors to perform operations comprising:
accessing, at a graph operations engine, a graph language request comprising:
 (a) a first tenant identifier of a first tenant and a second tenant identifier of a second tenant, wherein the first tenant identifier and the second tenant identifier each identify identifies corresponding first tenant data and second tenant data on a computing device of a cloud computing platform; and
 (b) a definition of data operations that execute the graph language request on the first tenant and the second tenant, the definition of data operations comprising a first definition parameter for a first data operation and a second definition parameter for a second data operation,
the first definition parameter identifies a first command library and a second command library associated with composing the first data operation,
the second definition parameter identifies the first command library and the second command library associated with composing the second data operation;
based on the first definition parameter, accessing a first command library request parameter of the first command library and a second command library request parameter of the second command library, wherein the first command library request parameter comprises an annotation defined using the second command library request parameter,
the second command library request parameter annotates the first command library request parameter with processing instructions for how to process results generated from executing the first data operation;
composing the first data operation using the first command library request parameter and the second command library request parameter;

based on the second definition parameter, accessing a first command library second request parameter and a second command library second request parameter;
composing the second data operation using the first command library second request parameter and the second command library second request parameter;
communicating the first data operation to a first computing node and the second data operation to a second computing node;
executing, via a first computing node, the first data operation, wherein executing the first data operation causes an update to the first tenant data of the first tenant associated with the first tenant identifier;
executing, via the second computing node, the second data operation, wherein executing the second data operation causes an update to the second tenant data associated with the second tenant identifier;
based on executing the first data operation and the second data operation, generating a consolidated result set based on a first set of results associated with the first data operation and the first tenant, and a second set of results associated with the second data operation and the second tenant; and
communicating the consolidated result set to a graph operations engine client to cause display of the consolidated result set.

9. The system of claim 8, wherein the graph language request further comprises an aggregation definition that includes instructions on how to consolidate a plurality of results of the data operations into a consolidated result set,
 wherein executing the data operations, via a plurality of computing nodes that accept and return results data, further comprises aggregating, using the aggregation definition of the graph language request, the plurality of results of the data operations into the consolidated result set.

10. The system of claim 8, wherein the graph language request comprises graph language request parameters of a graph language grammar that supports composing the data operations, transforming the definition of data operations into a tree of data operation nodes, and aggregating a set of results from the tree of data operation nodes.

11. The system of claim 8, wherein the first command library is based on a Hypertext Transfer Protocol ("HTTP") and wherein the second command library is based on a Structured Query Language (SQL),
 wherein a request parameter of the first command library is an HTTP request and a request parameter of the second command library is an SQLite statement, wherein the HTTP request is annotated with the SQLite statement as a query directive that modifies a response that is returned by the HTTP request.

12. The system of claim 8, wherein the graph language further supports each of the following:
recursively nesting the first command library request parameter of the graph language request or the second command library request parameter of the graph language request, wherein recursively nested portions of the graph language request are submitted as input when executing data operations of the definition;
substitution tokens that are evaluated and string-replaced causing generation of one or more result string values;
a first data operation type executed using one or more data APIs that provide data, the data is replacement data in string replacement operations;
a second data operation type executed using a database query, wherein a leaf node set of results that is stored in in-memory SQL data tables are accessed to generate results for the database query; and a third data operation type executed using a terminal statement associated with a first pipeline and a second pipeline, wherein at least a portion of data is associated with executing the first pipeline and the second pipeline is shared between the first pipeline and the second pipeline.

13. The system of claim 8, wherein executing the data operations of the definition further comprises periodically streaming a subset of intermediate results, from one or more leaf nodes in a plurality of leaf nodes that execute the data operations, towards a root node in a tree of data operation nodes, wherein streaming the subset of intermediate results is based on a threshold subset of intermediate results.

14. The system of claim 8, wherein results associated with the data operations are stored as one of the following graph operations engine entities: graph operation entity, graph operation result entity, and graph operation request entity, wherein the graph operations engine entities are retrievable as supplemental data.

15. One or more hardware computer-storage media having computer-executable instructions embodied thereon that, when executed by a computing system having a processor and memory cause the processor to execute operations comprising:

accessing, at a graph operations engine, a graph language request comprising:

(a) a first tenant identifier of a first tenant and a second tenant identifier of a second tenant, wherein the first tenant identifier and the second tenant identifier each identify corresponding first tenant data and second tenant data on a computing device of a cloud computing platform; and (b) a definition of data operations that execute the graph language request on the first tenant and the second tenant, the definition of data operations comprising a first definition parameter for a first data operation and a second definition parameter for a second data operation, the first definition parameter identifies a first command library and a second command library associated with composing the first data operation, the second definition parameter identifies the first command library and the second command library associated with composing the second data operation;

based on the first definition parameter, accessing a first command library request parameter of the first command library and a second command library request parameter of the second command library, wherein the first command library request parameter comprises an annotation defined using the second command library request parameter, the second command library request parameter annotates the first command library request parameter with processing instructions for how to process results generated from executing the first data operation;

composing the first data operation using the first command library request parameter and the second command library request parameter;

based on the second definition parameter, accessing a first command library second request parameter and a second command library second request parameter;

composing the second data operation using the first command library second request parameter and the second command library second request parameter;

communicating the first data operation to a first computing node and the second data operation to a second computing node;

executing, via the first computing node, the first data operation, wherein executing the first data operation causes an update to the first tenant data associated with the first tenant identifier;

executing, via the second computing node, the second data operation, wherein executing the second data operation causes an update to the second tenant data associated with the second tenant identifier;

based on executing the first data operation and the second data operation, generating a consolidated result set based on a first set of results associated with the first data operation and the first tenant, and a second set of results associated with the second data operation and the second tenant; and communicating the consolidated result set to a graph operations engine client to cause display of the consolidated result set.

16. The media of claim 15, wherein the graph language request further comprises an aggregation definition that includes instructions on how to consolidate a plurality of results of the data operations into the consolidated result set, wherein executing the data operations via a plurality of computing nodes that accept and return results data further comprises aggregating, using the aggregation definition of the graph language request, the plurality of results of the data operations into the consolidated result set.

17. The media of claim 15, wherein the first command library is based on a Hypertext Transfer Protocol ("HTTP") and wherein the second command library is based on a Structured Query Language (SQL), wherein a request parameter of the first command library is an HTTP request and a request parameter of the second command library is an SQLite statement, wherein the HTTP request is annotated with the SQLite statement as a query directive that modifies a response that is returned by the HTTP request.

18. The media of claim 15, wherein the graph language further supports each of the following:

recursively nesting the first command library request parameter of the graph language request or the second command library request parameter of the graph language request, wherein recursively nested portions of the graph language request are submitted as input when executing data operations of the definition;

substitution tokens that are evaluated and string-replaced causing generation of one or more result string values;

a first data operation type executed using one or more data APIs that provide data, the data is replacement data in string replacement operations;

a second data operation type executed using a database query, wherein a leaf node set of results that is stored in in-memory SQL data tables are accessed to generate results for the database query; and a third data operation type executed using a terminal statement associated with a first pipeline and a second pipeline, wherein at least a portion of data is associated with executing the first pipeline and the second pipeline is shared between the first pipeline and the second pipeline.

19. The media of claim 15, wherein executing the data operations of the definition further comprises periodically streaming a subset of intermediate results, from one or more leaf nodes in a plurality of leaf nodes that execute the data operations, towards a root node in a tree of data operation nodes representing the data operations of the definition, wherein streaming the subset of intermediate results is based on a threshold subset of intermediate results.

20. The media of claim 15, wherein results associated with data operations are stored as one of the following graph operations engine entities: graph operation entity, graph operation result entity, and graph operation request entity, wherein the graph operations engine entities are retrievable as supplemental data.

* * * * *